(12) United States Patent
Raghavan et al.

(10) Patent No.: US 10,860,530 B2
(45) Date of Patent: Dec. 8, 2020

(54) METHOD AND SYSTEM FOR MIGRATING AUTOMATION ASSETS IN AN ENTERPRISE SYSTEM

(71) Applicant: WIPRO LIMITED, Bangalore (IN)

(72) Inventors: Girish Raghavan, Chennai (IN); Thamilchelvi Peterbarnabas, Chennai (IN); Deepika Sivakumar, Chennai (IN); Rajkumar Kanakaraj, Vellore (IN)

(73) Assignee: Wipro Limited, Bangalore (IN)

( * ) Notice: Subject to any disclaimer, the term of this patent is extended or adjusted under 35 U.S.C. 154(b) by 385 days.

(21) Appl. No.: 15/468,833

(22) Filed: Mar. 24, 2017

(65) Prior Publication Data
US 2018/0267978 A1  Sep. 20, 2018

(30) Foreign Application Priority Data
Mar. 14, 2017  (IN) .............................. 201741008813

(51) Int. Cl.
*G06F 16/11* (2019.01)
*G06F 16/178* (2019.01)

(52) U.S. Cl.
CPC .......... *G06F 16/119* (2019.01); *G06F 16/122* (2019.01); *G06F 16/1794* (2019.01)

(58) Field of Classification Search
CPC ... G06F 16/119; G06F 16/122; G06F 16/1794
USPC ....................................................... 707/756
See application file for complete search history.

(56) References Cited

U.S. PATENT DOCUMENTS

| | | | | |
|---|---|---|---|---|
| 8,578,336 | B1* | 11/2013 | Wiradarma | G06F 11/3684 717/125 |
| 9,098,364 | B2* | 8/2015 | Davis | G06F 8/60 |
| 10,198,507 | B2* | 2/2019 | Pawar | G06F 16/36 |
| 2006/0156287 | A1* | 7/2006 | Vikram | G06F 11/3684 717/124 |
| 2008/0306986 | A1* | 12/2008 | Doyle, Sr. | G06F 8/51 |
| 2011/0107327 | A1* | 5/2011 | Barkie | G06F 8/63 717/176 |
| 2015/0019488 | A1* | 1/2015 | Higginson | G06F 16/214 707/634 |
| 2018/0060210 | A1* | 3/2018 | Pandey | G06F 11/3604 |

(Continued)

*Primary Examiner* — Robert W Beausoliel, Jr.
*Assistant Examiner* — Arthur Ganger
(74) *Attorney, Agent, or Firm* — Finnegan, Henderson, Farabow, Garrett & Dunner, LLP

(57) ABSTRACT

Disclosed herein is a method and system for migrating automation assets in an enterprise system. The method includes receiving, by an asset management system, an input data associated with the automation assets from a source application. Also, the method includes configuring a first set of data types associated with the input data, by identifying a corresponding data type from a second set of data types, configured in a target application. Further, the method includes generating a relationship between each of a plurality of entities associated with the first set of data types and a corresponding plurality of entities associated with the second set of data types in the target application. Finally, the method includes migrating the plurality of entities associated with the first set of data types from the source application to the target application based on the generated relationship.

15 Claims, 6 Drawing Sheets

(56) References Cited

U.S. PATENT DOCUMENTS

2018/0239692 A1\* 8/2018 Kalyanasundram .. G06F 11/263
2019/0213116 A1\* 7/2019 Kulkarni ................. G06N 5/02

\* cited by examiner

METHOD AND SYSTEM FOR MIGRATING AUTOMATION ASSETS IN AN ENTERPRISE SYSTEM

TECHNICAL FIELD

The present subject matter is related, in general to an enterprise system, and more particularly, but not exclusively to a method and a system for migrating automation assets in an enterprise system.

BACKGROUND

There are multiple test automation tools that are available in the market, which are open source. If there is any requirement by a user to enhance or add some extra features to an existing test automation tool, the tool may not support any enhancements or addition of some extra features. Also, the existing test automation tools may not support the use of new and advanced technologies. To use the advance technologies or add extra features, one of the solutions available is to move all additional information and technology needs to one tool. To achieve this, the user might write all the scripts or coding, which exists in the present tool in to the new tool again. There is no proper technical solution for achieving this. Also, to write all the scripts for the new tool, amount of time and effort consumed in huge.

Also, the test automation tools that are available in the market, due to specific features may aligned with new technologies. The enterprises or users always look for migrating from one automation tool to another, moving from commercial tools to open source tool, increasing the efficiency and coverage of the test automation tool. This presents the enterprises with a problem of moving the existing automation assets, created using existing tools to the new tool. In such a situation, the enterprises might contemplate between maintaining the existing assets in current tools, thereby ending up with a fragmented tool landscape. Also, enterprises ground up migration from the existing tool to the new tool which involves a high cost.

SUMMARY

Disclosed herein is a method for migrating automation assets in an enterprise system. The method includes receiving, by an asset management system, an input data associated with the automation assets from a source application. Also, the method includes configuring a first set of data types associated with the input data, by identifying a corresponding data type from a second set of data types, configured in a target application. Further, the method includes generating a relationship between each of a plurality of entities associated with the first set of data types and a corresponding plurality of entities associated with the second set of data types in the target application. Finally, the method includes migrating the plurality of entities associated with the first set of data types from the source application to the target application based on the generated relationship.

Also, the present disclosure discloses an asset management system for migrating automation assets in an enterprise system. The asset management system includes a processor and a memory. The memory may be communicatively coupled to the processor. The memory stores processor-executable instructions. The instruction, upon execution causes the processor to receive an input data associated with the automation assets from a source application. Upon receiving the input data, configure a first set of data types associated with the input data, by identifying a corresponding data type from a second set of data types, configured in a target application. Further, the processor generates a relationship between each of a plurality of entities associated with the first set of data types and a corresponding plurality of entities associated with the second set of data types in the target application. Finally, the processor migrates the plurality of entities associated with the first set of data types from the source application to the target application based on the generated relationship.

Further, the present disclosure discloses a non-transitory computer readable medium including instructions stored thereon that when processed by at least one processor cause an asset management system to perform operations comprising receiving an input data associated with the automation assets from a source application. Upon receiving the input data, the instructions cause the asset management system to configure a first set of data types associated with the input data by identifying a corresponding data type from a second set of data types, configured in a target application. Further, the instructions cause the asset management system to generate a relationship between each of a plurality of entities associated with the first set of data types and a corresponding plurality of entities associated with the second set of data types in the target application. Finally, the instructions cause the asset management system to migrate the plurality of entities associated with the first set of data types from the source application to the target application based on the generated relationship.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
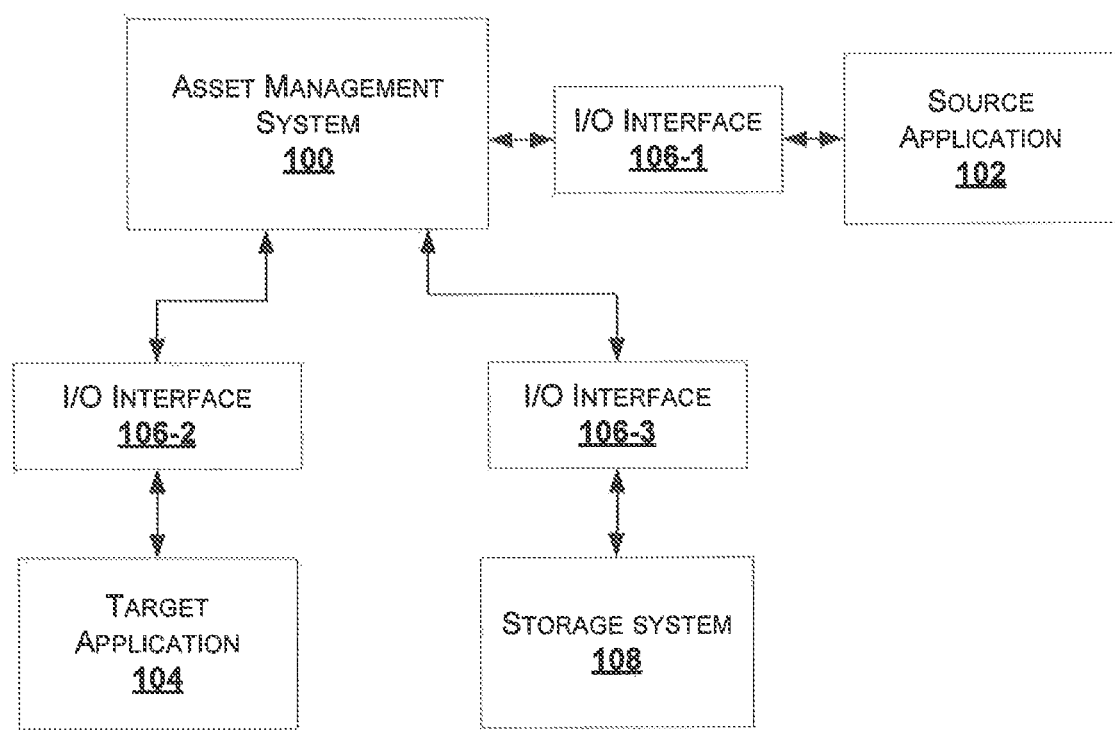
FIG. 1 shows an exemplary environment for migrating automation assets in an enterprise system, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown or not.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system for migrating automation assets in an enterprise system. The system may be configured to receive input data associated with the automation assets from a source application. The system configures a first set of data types associated with the input data, by identifying a corresponding data type from a second set of data types, configured in a target application. Further, the system generates a relationship between each of a plurality of entities associated with the first set of data types and a corresponding plurality of entities associated with the second set of data types in the target application. Thereafter, the system migrates the plurality of entities associated with the first set of data types from the source application to the target application based on the generated relationship.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for migrating automation assets in an enterprise system, in accordance with an embodiment of the present disclosure.

As shown in the FIG. 1, the exemplary environment includes an asset management system 100 to migrate automation assets in an enterprise system. The asset management system 100 is also referred as a system or migration system. The system is connected to one or more external sources, such as, but not limited to, source application 102, target application 104 and a storage system 108, through one or more I/O interfaces 106-1, 106-2, 106-3. The one or more I/O interfaces 106-1, 106-2, 106-3 together is referred as an I/O interface 106.

In one embodiment, the asset management system 100 is an automated computing system which migrates automation assets in an enterprise system, from the source application 102 to the target application 104. The asset management system 100 receives input data from the source application 102 through the I/O interface 106-1. The I/O interface 106-1, used by the asset management system 100, may be at least one of simple object access protocol (SOAP), representational state transfer (REST) and the like. The asset management system 100 is connected to the target application 104 through an I/O interface 106-2 which may be at least one of simple object access protocol (SOAP), representational state transfer (REST) and the like.

The asset management system 100 receives an input data associated with the automation assets from the source application 102. The input data includes at least one of a plurality of scripts, a plurality of libraries, a plurality of objects, a plurality of functions and a plurality of data files. Also, the asset management system 100 configures the input data and identifies a corresponding data type from the target application 104. Upon identifying the corresponding data type, the asset management system 100 generates a relationship between each data type of the input data and the corresponding data type of the target application 104. Further, the input data is migrated from the source application 102 to the target application 104, based on the generated relationship.

Figure 2:
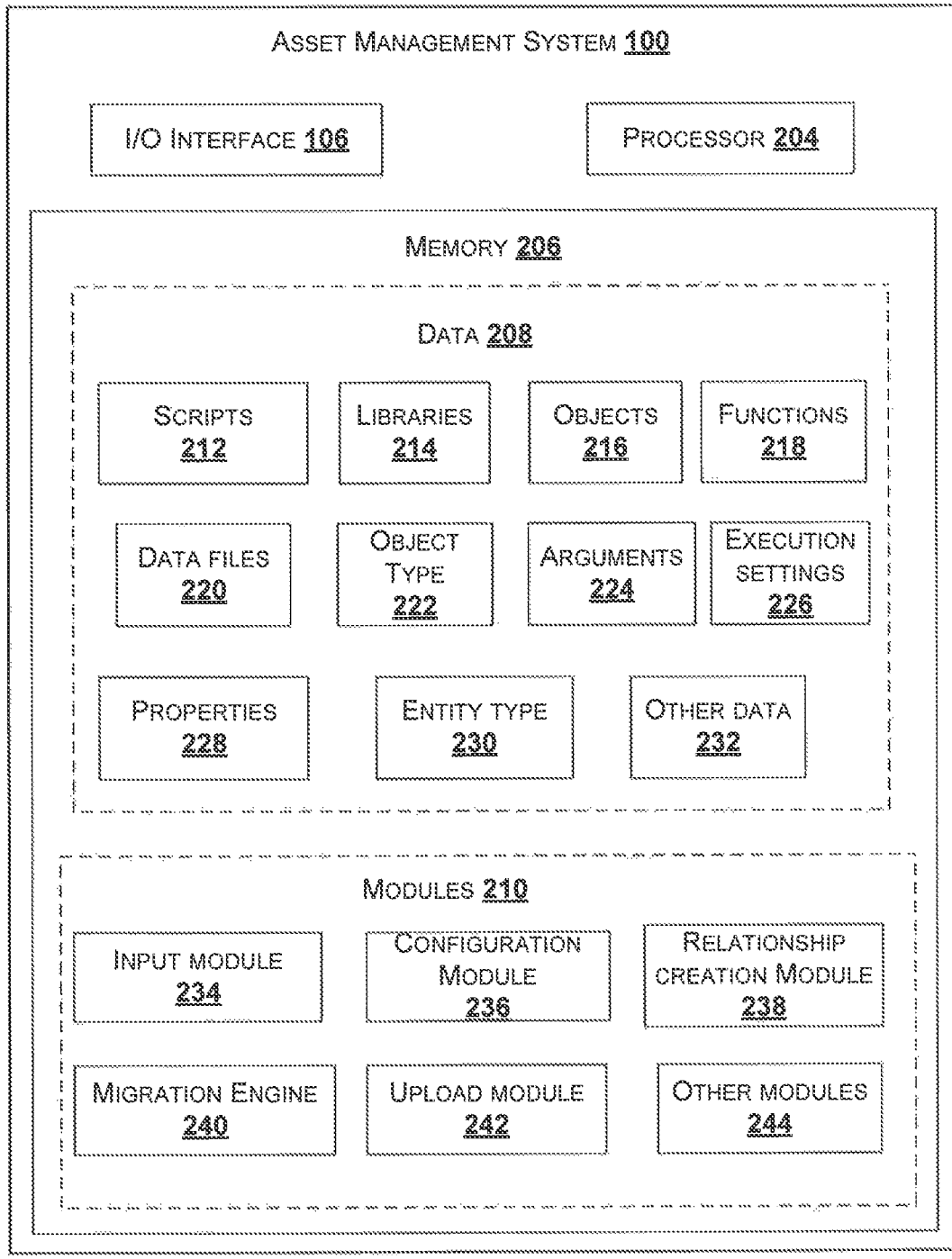
FIG. 2 shows a detailed block diagram illustrating an asset management system for migrating automation assets in an enterprise system, in accordance with an embodiment of the present disclosure.

FIG. 2 shows a detailed block diagram illustrating an asset management 100 for migrating automation assets in an enterprise system, in accordance with an embodiment of the present disclosure.

The asset management system 100 includes an I/O interface 106, a processor 204 and a memory 206. The I/O interface 106 may be configured to read and retrieve data from the source application 102. The source application 102 is also referred as source automation tool. The memory 206 may be communicatively coupled to the processor 204. The processor 204 may be configured to perform one or more functions of the asset management system 100 for migrating automation assets in an enterprise system. In one implementation, the asset management system 100 may comprise data 208 and modules 210 for performing various operations in accordance with the embodiments of the present, disclosure. In an embodiment, the data 208 may be stored within the memory 206 and may include, without limiting to, scripts 212, libraries 214, objects 216, functions 218, data files 220, object type 222, arguments 224, execution settings 226, properties 228, entity type 230 and other data 232.

In some embodiments, the data 208 may be stored within the memory 206 in the form of various data structures. Additionally, the data 208 may be organized using data models, such as relational or hierarchical data models. The other data 232 may store data, including temporary data and temporary files, generated by modules 210 for performing the various functions of the asset management system 100.

In an embodiment, the assent management system 100 receives input data from the source application 102. The input data includes at least one of a plurality of scripts 212, a plurality of libraries 214, a plurality of objects 216, a plurality of functions 218 and a plurality of data files 220. Each of the plurality of scripts 212 is a series of commands within a file that is capable of being executed without being compiled. Each of the plurality of scripts 212 is a short program executed for verifying certain parameters, associated with the source application 102.

Each of plurality of libraries 214 includes library files, which modularize the scripts 212. Each of the plurality of libraries 214 includes variable declaration, a plurality of functions, a plurality of classes and the like.

The input data received from the source application 102 includes a plurality of first set of data types, each of the plurality of first set of data types is one of data file 220, object type 222, argument 224 and execution settings 226. Also, each of the plurality of first set of data types includes a plurality of entities, also referred as properties. Each of the plurality of entities is one of a property 228 and an argument 224.

The data of the target application 104 includes a plurality of second set of data types, each of the plurality of second data types is one of data file 220, object type 222, arguments 224 and execution settings 226. Also, each of the plurality of second set of data types includes a plurality of entities. Each of the plurality of entities is one of properties 228 and an argument/entity type 230.

In some embodiment, the data 208 may be processed by one or more modules 210 of the asset management system 100. In some implementation, the one or more modules 210 may be stored with the memory 206. In another implementation, the one or more modules 210 may be communicatively coupled to the processor 204 for performing one or more functions of the asset management system 100. The modules 210 may include, without limiting to, an input module 234, a configuration module 236, a relationship creation module 238, a migration engine 240, an upload module 242 and other modules 244.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 244 may be used to perform various miscellaneous functionalities of the asset management system 100. In one embodiment, a test data transformation module (not shown) is configured in the asset management system 100 to transforms the input data, received by the asset management system 100 from the source application 102, for migration in to the target application 104. It will be appreciated that such modules 244 may be represented as a single module or a combination of different modules.

In an embodiment, the input module 234 may be responsible for receiving input data from the source application 102. The input module 234 interacts with the source application 102 through the I/O interface 1064 for receiving the input data. The input module 234 includes a user interface (UI) module (not shown) for receiving inputs from a user. The user selects the source application 102 and the target application 104 using the from a list of source applications and target application, shown on the UI. The data associated with the selected source application 102 and the target application 104 is stored in the storage system 108.

Also, the input module 234 receives input data from the source application 102, which includes at least one of a plurality of scripts 212, a plurality of libraries 214, a plurality of objects 216, a plurality of functions 218 and a plurality of data files 220.

The configuration module 236 configures a first set of data types associated with the input data, by identifying a corresponding data type from a second set of data types, configured in a target application 104, in an embodiment of the present disclosure.

In an embodiment, the configuration module 236 obtains at least one of the first set of data types associated with the input data, received from the source application 102. Also, the configuration module 236 obtains data associated with the target application 104, based on details received by a user. The configuration module 236 identifies a second set of data types using the data associated with the target application 104. The identified second set of data types corresponds to the first set of data types. Thereafter, the configuration module 236 stores the at least one of first set of data types and identified second set of data types in the storage system 108, based on location identified by the user.

Figure 3A:
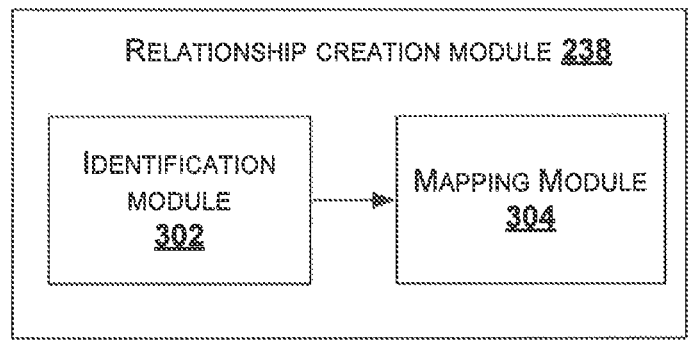
FIG. 3A illustrates a block diagram of a relationship creation module in accordance with an embodiment of the present disclosure.

The relationship creation module 238 generates a relationship between the first set of data type and the second set of data types using associated properties. The properties associated with the first set of data types and the second set of data types are also referred as plurality of entities. Thus, the relationship creation module 238 generates a relationship using each of a plurality of entities associated with the first set of data types and a corresponding plurality of entities associated with the second set of data types, in an embodiment of the present disclosure. The sub modules of the relationship creation module 238 are illustrated in FIG. 3A. The sub modules of the relationship creation module 238 includes an identification module 302 and a mapping module 304.

The identification module 302, receives the first set of data types and the second set of data types from the configuration module 236. The identification module 302 identifies a plurality of entity types 230 for each of the first set of data types associated with the input data and each of the second set of data types associated with the target application 104. Each of the first set of data types is one of objects 216, functions 218, execution settings 226 and data files 220. Also, each of the second set of data types is at least one of objects 216, arguments 224, execution settings 226 and data files 220.

The mapping module 304, receives each of the identified plurality of entity types 230 of the first set of data types and performs mapping with a corresponding plurality of identified entity types associated with the second set of data types, thereby generating the relationship. The each of the plurality of entities is one of a property 228 and an argument 224, associated with one of the first set of data types and second set of data types, respectively.

In one embodiment, the asset management system 100 displays a list of target applications on the user interface (not shown in the FIGS.), to select the target application 104. Upon selecting the target application 104, the configuration modules 236 configures the first set of data types associated with the input data, by identifying a corresponding data type from a second set of data types, configured in a target application 104, thereafter, the relationship creation module 238 identifies the first set of data types.

For example, let the identification module 302 identify one of the first set of data types as an object type 222. The object properties of the selected object type may be displayed in the user interface by the relationship creation module 238. If a relationship between the object properties associated with the first set of data types and the corresponding object properties associated with the second set of data types, already exists then corresponding data is retrieved from the storage system 108 and displayed on the user interface. In an embodiment, the user may modify the relationship associated with the retrieved. In an embodiment, if a relationship is not established for data properties associated with the first set of data types, from the source application 102, then the relationship creation module 238 generates a relationship for the data properties associated with the first set of data types with the corresponding data properties associated with the second set of data types, i.e. mapping the relationship between the source application 102 and the target object types and properties. The relationship generated may be stored in the storage system 108.

Figure 3B:
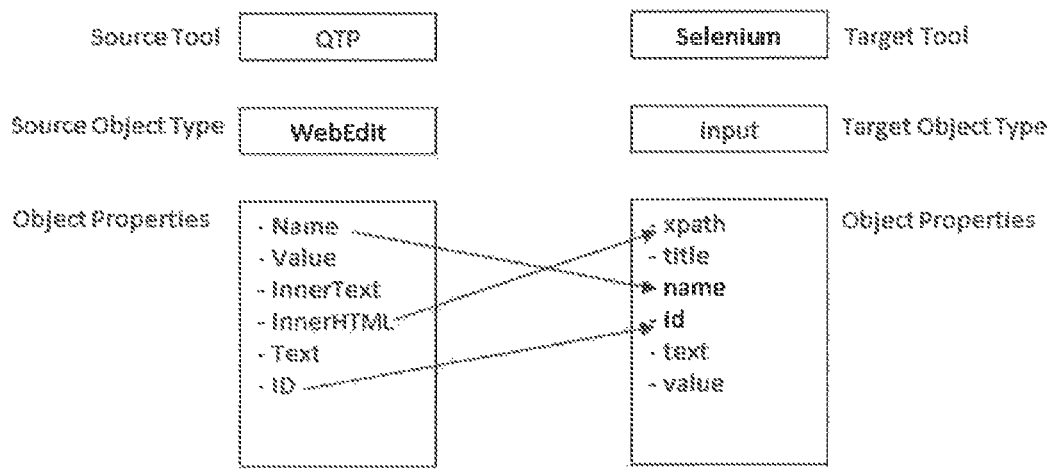
FIG. 3B illustrates an exemplary relationship generated between data associated with the source application and the target application, in accordance with an embodiment.

FIG. 3B illustrates an exemplary relationship generated between data associated with the source application 102 and the target application 104, in accordance with an embodiment. Let the source application 102 be a quick test professional (QTP) and the target application 104 be Selenium. Let, the object type be WebEdit for the source application 102 QTP, and the corresponding object type of the target application 104 Selenium is input. Upon selecting the object types for source application 102 and target application 104, then the corresponding plurality of entities, also referred as object properties, are listed and the relationship is generated by the relationship creation module 238 between the object properties, as shown in FIG. 3B. The example as shown in FIG. 3B, the mapping is performed between the corresponding entities or properties of the data types. The properties associated with the first set of data types from the source application WebEdit is mapped to name of input object from Selenium. Similarly, InnerHTML is mapped to xpath and ID is mapped to id.

Figure 3C:
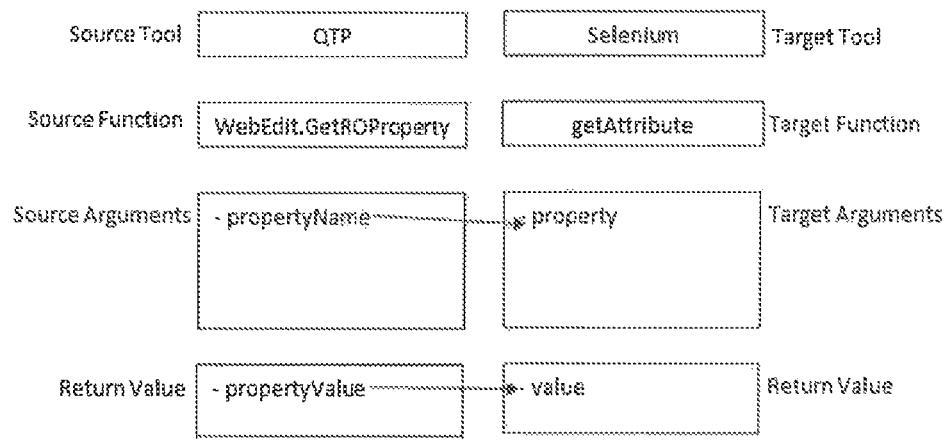
FIG. 3C illustrates an exemplary relationship generated between data associated with the source application and the target application, in accordance with another embodiment.

FIG. 3C illustrates an exemplary relationship generated between data associated with the source application 102 and the target application 104, in accordance with another embodiment. For example, let the identification module 302 identify one of the first set of data types as a function and second set of data types is a function. The user may select the function name of the source application 102, using the user interface. The arguments of the selected source function call may be displayed in the User Interface by the relationship creation module 238. If a relationship between the function properties associated with the first set of data types and the corresponding function properties associated with the second set of data types, already exists then corresponding data is retrieved from the storage system 108 and displayed on the user interface.

In an embodiment, the user may retrieve date from the storage system 108 and modify an existing relationship, associated with the retried data. In an embodiment, if a relationship is not established for data properties associated with the first set of data types, from the source application 102, then the relationship creation module 238 generates a relationship for the data properties associated with the first set of data types with the corresponding data properties associated with the second set of data types, i.e. mapping the relationship between the function properties associated with the source application 102 and the function properties associated with the target application 104. The relationship generated may be stored in the storage system 108.

Also, as shown in FIG. 3C the mapping is performed between the corresponding entities or properties of the data types. The properties associated with the first set of data types from the source application 102 WebEdit.GetROProperty is mapped to target function is getAttribute of Selenium. Then, the corresponding arguments of the functions are listed and the relationship is defined between the arguments. For example, the arguments propertyName from WebEdit.GetROProperty of the Source application 102 is mapped to property of getAttribute function from target application 104. Similarly, a return value propertyValue of source function is mapped to value from target function.

Figure 3D:
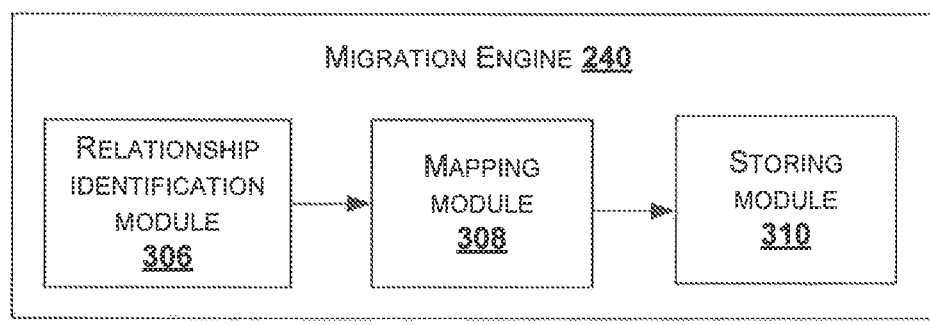
FIG. 3D illustrates a block diagram of a migration engine in accordance with an embodiment of the present disclosure.

Referring to FIG. 2, the migration engine 240 may be responsible for migrating the plurality of entities associated with the first set of data types from the source application 102 to the target application 104 based on the generated relationship, in an embodiment of the present disclosure. The sub modules of the migration engine 240 are illustrated in FIG. 3D. The sub modules of the migration engine 240 includes relationship identification module 308, mapping module 310 and a storing module 312.

The relationship identification module 306 obtains the first set of data types and the second set of data types from the source application 102 and the target application 104 respectively. Also, relationship identification module 306 obtains a plurality of entity types for each of the first set of data types and identifies relationship between each of the obtained entity type with a corresponding entity type of the second set of data types.

In an embodiment, let the relationship identification module 306 identify a non-establishment of a relationship for an entity type, associated with the first set of data types with a corresponding entity type associated with the second set of data types. Then, the mapping module 308 maps the entity type, associated with the first set of data types, with a corresponding entity type being identified from the second set of data types thus obtained. Also, the mapping module 308 establishes a relationship between the entity type, associated with the first set of data types, with the corresponding entity type identified from the second set of data types, thus obtained. The storing module 310 stores values associated with the established relationship. Thereafter, the migration engine 240 migrates the data associated with the source application 102 to the target application 104 based on the relationships created using relationship creation module 238.

The migration engine 240 connects to the configuration module 236 to obtain the data associated with the source application 102 and the target application 104. Also, the migration engine 240 may connect to the storage system 1.08 to obtain a plurality of scripts 212 and plurality of object files of the source application 102. The migration engine 240 may identify the file type as one of objects and functions based on the obtained data from the source application 102.

For example, let the file type be an object then the migration engine 240 may read the objects line by line from the first objects file of the source application 102. Next, the migration engine 240 identifies whether a relationship is already defined and stored in the storage system 108 for the identified source object type. If a relationship is defined for the source object type, then the list of object types from the target application 104 may be retrieved. The migration engine 240 may obtain a match of a target object type from the list of objects of the target application 104 using text comparison. If a target object type is found, then the plurality of entities of the target object type is retrieved for the selected target application 104. The migration engine 240 may search for a saved relationship, if similar mapping is defined for the identified properties of the target application 104. Based on the identified mapping, a new relationship for the identified source and target object types may be stored in the storage system 108.

In case there is no matching for the object type is found using the text comparison, then the relationship creation module 238 is invoked and the migration engine 240 may wait till a new relationship is created for the identified source object type. Once the relationship is successfully generated for the identified source object type, the properties mapping may be retrieved from the storage system 108. The migration engine 240 may identify the values for the mapped properties from the source objects file. Then, the migration engine 240 migrates the source object to the corresponding target object based on the objects relationship and the property values from the source object file.

Let the source application 102 be a quick test professional (QTP) and the target application 104 be Selenium. Let, the file type be a function, then the migration engine 240 reads the scripts line by line from the first scripts file of the source application 102. The migration engine 240 identifies the source function call of the scripts 212 read from the source file. Then, the relationship identification module 308, configure in the migration engine 240 verifies whether a relationship is already defined and stored in the storage system 108 for the identified source function call. If there is no relationship defined for the source function call, then the relationship creation module 238 is invoked for generating a new relationship for the identified source function call.

Once the relationship is successfully created or identified for the identified source function call, the arguments mapping for the source function call will be retrieved from the storage system 108. The migration engine 240 identifies the values for the mapped arguments from the source function. The migration engine 240 also identifies return values for the source function if a relationship is defined. Then, the migration engine 240 migrates the source function call to the corresponding target function call based on the arguments relationship and the argument values from the source function. The migration engine 240 performs the identification and creation of relationship from the start of first source function file till the end of the first source function file is reached. Also, for all the script functions from the source script file may be migrated to the target application 104. The functions migrated to the target application 104 may be stored as target script file supported by the target application 104.

In one embodiment, the migration engine 240 migrates test data and executing settings file from the source application 102 to target application 104. The source application 102 and the target application 104 is selected by the configuration module 236, which may be provided as input to the migration engine 240. If file type is selected as data file, then the user will select a source file type and a target file type for migrating the test data. In an embodiment, if the file type is selected as execution settings, then the user may select the source execution settings and target execution settings file type to migrate the execution settings. Based on the file types selected for the source application 102 and target application 104, the migration engine 240 may migrate the source file to the corresponding file format.

For example, considering the source application 102 as QTP then the execution settings file may be of type XML. Also, considering the target application 104 as Selenium, then the execution settings file may be of type properties. Then, the migration engine 240 may take the source XML file from the QTP and migrates properties file of Selenium, which is the selected target application 104.

Referring to FIG. 2, the upload module 242 performs uploading of the migrated plurality of entities associated with the first set of data types from the source application 102 to the target application 104. That is the upload module 242 uploads automation scripts 212, objects 216 and data files 220 from the source application 102 to the target application 104. The data stored by the storing module 310, configured in the migration engine 240, that is scripts 212 and object files generated through the migration engine 240 may be uploaded by the upload module 242 in to the target application 104.

In an embodiment, the upload module 242 validates the migrated first set of data types by executing at least one of a plurality of scripts 212 associated with the first set of data types. Thereafter, the upload module 242 publishes execution results to the user, after successful validation.

Figure 4:
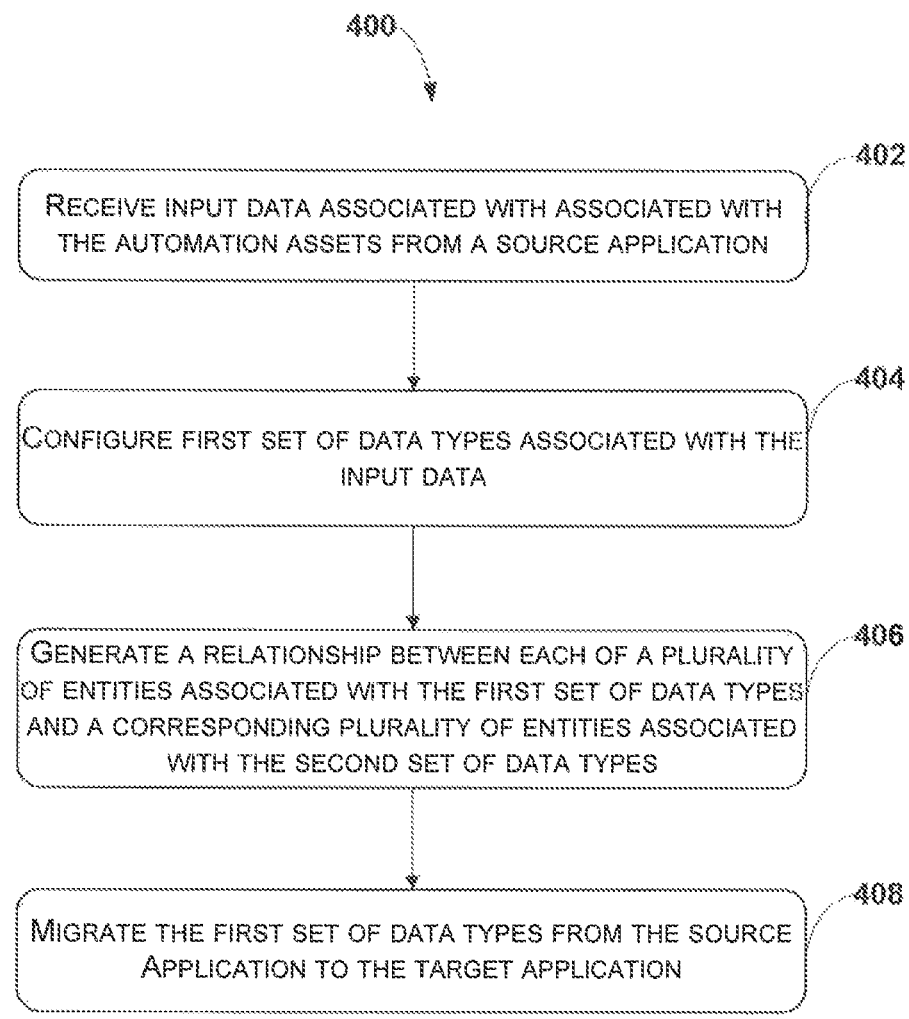
FIG. 4 shows a flowchart illustrating a method for migrating automation assets in an enterprise system, in accordance with an embodiment of the present disclosure.

FIG. 4 shows a flowchart illustrating a method for migrating automation assets in an enterprise system, in accordance with some embodiments of the present disclosure.

As illustrated in FIG. 4, the method 400 includes one or more blocks for depicting an asset management system 100 for migrating automation assets in an enterprise system. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 402, receiving an input module 234, configured in the asset management system 100, an input data associated with the automation assets from a source application 102.

The input module 234 receives the input data, from the source application 102 through the I/O interface 106. The input data includes at least one of a plurality of scripts 212, a plurality of libraries 214, a plurality of objects 216, a plurality of functions 218 and a plurality of data types. Each of the plurality of data types is at least one of object type 222, arguments 224, data files 220 and execution settings 226. In one embodiment, each of the plurality of data types is at least one of object type 222, arguments 224, data files 220 and execution settings 226.

At block 404, configuring a first set of data types associated with the input data by the configuration module 236, configured in the asset management system 100. In one embodiment, the configuration is done by identifying a corresponding data type from a second set of data types associated with the target application 104. The configuring of the first set of data types associated with the input data includes obtaining at least one of the first set of data types associated with the input data from the source application 102. Also, obtaining data associated with the target application 104, based on details received by a user. Further, identifying the second set of data types using the data associated with the target application 104. Also, the configuration module 236 stores the at least one of first set of data types and identified second set of data types in a storage unit 108, based on location identified by the user.

At block 406, generating by the relationship creation module 238, configured in the asset management system 100, a relationship between each of a plurality of entities associated with the first set of data types and a corresponding plurality of entities associated with the second set of data types in the target application 104. The relationship creation module 238 generates the relationship by identifying an entity type for each of the first set of data types associated with the input data, and second set of data types associated with the target application 104. Thereafter, performs mapping of each of the identified entity type of the first set of data types with a corresponding identified entity type of the second set of data types, thereby generating the relationship.

At block 408, migrating, by the migration engine 240 configured in the asset management system 100, the plurality of entities associated with the first set of data types from the source application 102 to the target application 104 based on the generated relationship. For migrating, the migration engine 240 obtains the first set of data types and the second set of data types from the source application 102 and the target application 104 respectively. Also, the migration engine 240 obtains an entity type for each of the first set of data types and the relationship between each of the obtained entity type with a corresponding entity type of the second set of data types. Thereafter, migrating values associated with each of the entity type associated with the first set of data types to the corresponding entity type associated with the second set of data types.

Also at block 408 the migration engine 240 upon identifying non-establishment of a relationship for an entity type, associated with the first set of data types with a corresponding entity type associated with the second set of data types, performs mapping the entity type, associated with the first set of data types, with a corresponding entity type being identified from the second set of data types thus obtained. Thereafter, establishing a relationship between the entity type, associated with the first set of data types, with the corresponding entity type identified from the second set of data types. Finally, the migration engine 240 performs storing the established relationship in a storage unit 108 of the asset management system 100.

Computer System

Figure 5:
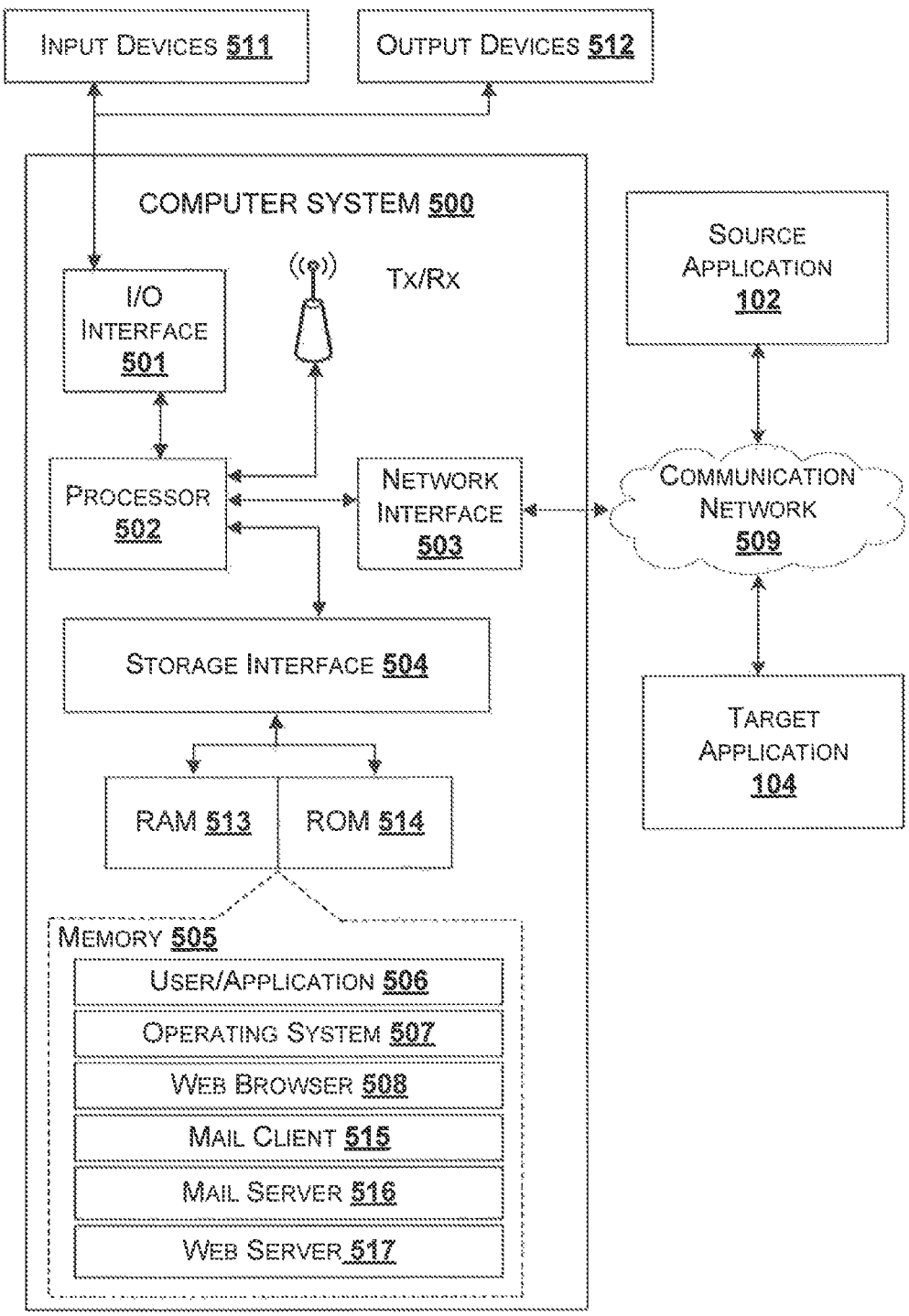
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 may be an asset management system 100 which is used for migrating automation assets in an enterprise system. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e,g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with one or more external sources, such as, but not limited to source application 102 and target application 104, receives input data from source application 102 and migrating automation assets to the target application 104. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/ application data 506, an operating system 507, web browser 508, mail client 515, mail server 516 and web server 517. In some embodiments, computer system 500 may store user/ application data 506, such as the data, variables, records and the like, as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/ 7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500 such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program components. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers 517 may utilize facilities such as AJAX, DHTML, Adobe Flash, JavaScript, Java, Application Programming Interfaces (APIs), etc. In some embodiments, the computer system 500 may implement a mail server 516 stored program component. The mail server 516 may be an Internet mail server such as Microsoft Exchange, or the like. The mail server 516 may utilize facilities such as Active Server Pages (ASP), ActiveX, American National Standards institute (ANSI) C++/C #, Microsoft .NET, CGI scripts, Java, JavaScript, PERL, PEP, Python, WebObjects, etc. The mail server 516 may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client 515 stored program component. The mail client 515 may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method for migrating automation assets in an enterprise system.

In an embodiment, the present disclosure enables migration of automation assets from an obsolete automation tool to a new version supporting new technologies.

In an embodiment, the present disclosure discloses a flexible system which can easily scale up to new automation tools in future.

In an embodiment, the present disclosure defines a relationship of functions and objects between source and target automation tools once which can be reused for multiple migrations.

In an embodiment, the present disclosure discloses migration of objects between different automation tools, in which time consumed for migrating is lesser than as compared to existing migration technique.

In an embodiment, the present disclosure discloses enabling migration of functions and automation scripts between different automation tools which requires high cost and reskilling if done manually The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate or not) may be used in place of a single device/article. Similarly, where more than one device or article is described herein (whether they cooperate or not), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Asset management system |
| 102 | Source application |
| 104 | Target application |
| 106-1, 106-2, 106-3 | I/O Interface |
| 108 | Storage system |
| 204 | Processor |
| 206 | Memory |
| 208 | Data |
| 210 | Modules |
| 212 | Scripts |
| 214 | Libraries |
| 216 | Objects |
| 218 | Functions |
| 220 | Data files |
| 222 | Object type |
| 224 | Arguments |
| 226 | Execution settings |
| 228 | Properties |
| 230 | Entity type |
| 232 | Other data |
| 234 | Input module |
| 236 | Configuration module |
| 238 | Relationship creation module |
| 240 | Migration engine |
| 242 | Upload module |
| 244 | Other modules |
| 302 | Identification module |
| 304 | Mapping module |
| 306 | Relationship identification module |
| 308 | Mapping module |
| 310 | Storing module |
| 500 | Computer System |
| 501 | I/O Interface |
| 502 | Processor |
| 503 | Network Interface |
| 504 | Storage Interface |
| 505 | Memory |
| 506 | User/Application Data |
| 507 | Operating System |
| 508 | Web Browser |
| 509 | Communication Network |
| 511 | Input Devices |
| 512 | Output Devices |
| 513 | RAM |
| 514 | ROM |
| 515 | Mail Client |
| 516 | Mail Server |
| 517 | Web Server |

What is claimed is:

1. A method for migrating automation assets between different test-automation-tools in an enterprise system, the method comprising:

receiving, by an asset management system, an input data associated with the automation assets from a source test automation tool, wherein the input data includes a plurality of scripts, a plurality of libraries, a plurality of objects, a plurality of functions and a plurality of test data files;

configuring, by the asset management system, a first set of data types associated with the input data, by identifying a corresponding data type from a second set of data types, configured in a target test automation tool, wherein the target test automation tool supports a new technology which is different from an existing technology used in the source test automation tool;

identifying, by the asset management system, an entity type of each of a plurality of properties associated with the first set of data types and the second set of data types, wherein the plurality of properties comprises a list of:

object properties, function properties and arguments associated with the first set of data types;

mapping, by the asset management system, each of the identified entity type of the first set of data types directly with a corresponding entity type of the second set of data types using text comparison, wherein values associated with one or more mapped properties are reused by the target automation tool during migration;

generating, by asset management system, a relationship between each of a plurality of properties associated with the first set of data types in the source test automation tool and a corresponding plurality of properties associated with the second set of data types in the target test automation tool, based on the mapping; and and migrating, by asset management system, the values associated with the one or more mapped properties associated with the first set of data types from the source test automation tool to the target test automation tool, based on the generated relationship.

2. The method as claimed in claim 1, wherein each of the first set of data types is at least one of object type, argument, data file and execution settings.

3. The method as claimed in claim 1, wherein each of the second set of data types is at least one of object type, argument, data file and execution settings.

4. The method as claimed in claim 1, wherein configuring the first set of data types associated with the input data comprises:

obtaining at least one of the first set of data types associated with the input data from the source test automation tool and data associated with the target test automation tool, based on details received by a user;

identifying the second set of data types, from the data associated with the target test automation tool, corresponding to the first set of data types; and storing the at least one of first set of data types associated with the input data and identified second set of data types in a storage unit, based on location identified by the user.

5. The method as claimed in claim 1, wherein migrating the plurality of properties from the source test automation tool to the target test automation tool comprises:

obtaining the first set of data types and the second set of data types from the source test automation tool and the target test automation tool respectively;

obtaining the entity type for each of the first set of data types;

obtaining the relationship between each of the obtained entity type with the corresponding entity type of the second set of data types; and migrating the values associated with each of the entity type associated with the first set of data types to the corresponding entity type associated with the second set of data types.

6. The method as claimed in claim 5, wherein migrating the plurality of properties from the source test automation tool to the target test automation tool further comprises:

identifying non-establishment of a relationship for the entity type, associated with the first set of data types with the corresponding entity type associated with the second set of data types;

mapping the entity type, associated with the first set of data types, with the corresponding entity type being identified from the second set of data types thus obtained;

establishing a relationship between the entity type, associated with the first set of data types, with the corresponding entity type identified from the second set of data types thus obtained; and storing the established relationship in a storage unit of the asset management system.

7. The method as claimed in claim 1 further comprises:

uploading the migrated plurality of properties associated with the first set of data types from the source test automation tool to the target test automation tool; and validating the first set of data types by executing at least one of a plurality of scripts associated with the first set of data types.

8. An asset management system for migrating automation assets between different test-automation-tools in an enterprise system, the asset management system comprising:

a processor; and a memory, communicatively coupled to the processor, wherein the memory stores processor-executable instructions, which, on execution, causes the processor to:

receive an input data associated with the automation assets from a source test automation tool, wherein the input data includes a plurality of scripts, a plurality of libraries, a plurality of objects, a plurality of functions and a plurality of test data files;

configure a first set of data types associated with the input data, by identifying a corresponding data type from a second set of data types, configured in a target test automation tool, wherein the target test automation tool supports a new technology which is different from an existing technology used in the source test automation tool;

identify an entity type of each of a plurality of properties associated with the first set of data types and the second set of data types, wherein the plurality of properties comprises a list of: object properties, function properties and arguments associated with the first set of data types;

map each of the identified entity type of the first set of data types directly with a corresponding entity type of the second set of data types using text comparison, wherein values associated with one or more mapped properties are reused by the target automation tool during migration;

generate a relationship between each of a plurality of properties associated with the first set of data types in the source test automation tool and a corresponding plurality of properties associated with the second set of data types in the target test automation tool, based on the mapping;

and migrate the values associated with the one or more mapped properties associated with the first set of data types from the source test automation tool to the target test automation tool, based on the generated relationship.

9. The system as claimed in claim 8, wherein each of the first set of data types is at least one of object type, argument, data file and execution settings.

10. The system as claimed in claim 8, wherein each of the second set of data types is at least one of object type, argument, data file and execution settings.

11. The system as claimed in claim 8, wherein to configure the first set of data types associated with the input data, the instructions cause the processor to:

obtain at least one of the first set of data types associated with the input data from the source test automation tool and data associated with the target test automation tool, based on details received by a user;

identify the second set of data types, from the data associated with the target test automation tool, corresponding to the first set of data types; and store the at least one of first set of data types associated with the input data and identified second set of data types in a storage unit, based on location identified by the user.

12. The system as claimed in claim 8, wherein to migrate the plurality of properties from the source test automation tool to the target test automation tool, the instructions cause the processor to:

obtain the first set of data types and the second set of data types from the source test automation tool and the target test automation tool respectively;

obtain the entity type for each of the first set of data types;

obtain the relationship between each of the obtained entity type with the corresponding entity type of the second set of data types; and migrate the values associated with each of the entity type associated with the first set of data types to the corresponding entity type associated with the second set of data types.

13. The system as claimed in claim 12, wherein to migrate the plurality of properties from the source test automation tool to the target test automation tool, the instructions cause the processor to:

identify non-establishment of a relationship for the entity type, associated with the first set of data types with the corresponding entity type associated with the second set of data types;

map the entity type, associated with the first set of data types, with the corresponding entity type being identified from the second set of data types thus obtained;

establish a relationship between the entity type, associated with the first set of data types, with the corresponding entity type identified from the second set of data types thus obtained; and store the established relationship in a storage unit of the asset management system.

14. The system as claimed in claim 8, wherein the instructions further cause the processor to:

upload the migrated plurality of properties associated with the first set of data types from the source test automation tool to the target test automation tool; and validate the first set of data types by executing at least one of a plurality of scripts associated with the first set of data types.

15. A non-transitory computer readable medium including instructions stored thereon that when processed by at least one processor cause an asset management system to perform operations comprising:

receiving an input data associated with the automation assets from a source test automation tool, wherein the input data includes a plurality of scripts, a plurality of libraries, a plurality of objects, a plurality of functions and a plurality of test data files;

configuring a first set of data types associated with the input data, by identifying a corresponding data type from a second set of data types, configured in a target test automation tool, wherein the target test automation tool supports a new technology which is different from an existing technology used in the source test automation tool;

identifying an entity type of each of a plurality of properties associated with the first set of data types and the second set of data types, wherein the plurality of properties comprises a list of:
object properties, function properties and arguments associated with the first set of data types;
mapping each of the identified entity type of the first set of data types directly with a corresponding entity type of the second set of data types using text comparison, wherein values associated with one or more mapped properties are reused by the target automation tool during migration;
generating a relationship between each of a plurality of properties associated with the first set of data types in the source test automation tool and a corresponding plurality of properties associated with the second set of data types in the target test automation tool, based on the mapping; and
migrating the values associated with the one or more mapped properties associated with the first set of data types from the source test automation tool to the target test automation tool based on the generated relationship.

\* \* \* \* \*